US008786773B2

(12) United States Patent
Iyoda et al.

(10) Patent No.: US 8,786,773 B2
(45) Date of Patent: Jul. 22, 2014

(54) IMAGING APPARATUS

(71) Applicant: Panasonic Corporation, Osaka (JP)

(72) Inventors: Makoto Iyoda, Osaka (JP); Yasuo Yokota, Osaka (JP); Miyoko Irikiin, Hyogo (JP); Tomonori Mizutani, Osaka (JP); Yasuhiro Miyamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/790,427

(22) Filed: Mar. 8, 2013

(65) Prior Publication Data
US 2013/0201294 A1 Aug. 8, 2013

Related U.S. Application Data

(63) Continuation of application No. PCT/JP2011/006323, filed on Nov. 11, 2011.

(30) Foreign Application Priority Data

Jul. 26, 2011 (JP) ................................. 2011-162729

(51) Int. Cl.
H04N 5/225 (2006.01)
(52) U.S. Cl.
USPC .............................. 348/375; 348/47; 348/373
(58) Field of Classification Search
USPC ........................................... 348/47, 373, 375
See application file for complete search history.

(56) References Cited

U.S. PATENT DOCUMENTS

| 2008/0117316 | A1* | 5/2008 | Orimoto | 348/240.3 |
| 2008/0158346 | A1 | 7/2008 | Okamoto et al. | |
| 2009/0123144 | A1* | 5/2009 | Maezono | 396/327 |
| 2011/0018970 | A1 | 1/2011 | Wakabayashi | |
| 2011/0242286 | A1* | 10/2011 | Pace et al. | 348/47 |

FOREIGN PATENT DOCUMENTS

| JP | 2008-167066 | 7/2008 |
| JP | 2008-275746 | 11/2008 |
| JP | 2009-48181 | 3/2009 |
| JP | 2011-10069 | 1/2011 |
| JP | 2011-45039 | 3/2011 |

OTHER PUBLICATIONS

International Search Report (ISR) issued Dec. 13, 2011 in International (PCT) Application No. PCT/JP2011/006323.
English translation of International Preliminary Report on Patentability issued in International (PCT) Application No. PCT/JP2011/006323, mailed Feb. 6, 2014.

* cited by examiner

Primary Examiner — Sath V Perungavoor
Assistant Examiner — Jeffery Williams
(74) Attorney, Agent, or Firm — Wenderoth, Lind & Ponack, L.L.P.

(57) ABSTRACT

An imaging apparatus comprises a first imaging unit, a second imaging unit whose use frequency is lower than that of the first imaging unit, an exterior case for housing the first imaging unit and the second imaging unit, and a brace mounting section mounted to the exterior case so as to be partially exposed to an outside. The first imaging unit, the second imaging unit and the brace mounting section are arranged so that a distance from the first imaging unit to the brace mounting section is longer than a distance from the second imaging unit to the brace mounting section.

7 Claims, 7 Drawing Sheets

IMAGING APPARATUS

CROSS-REFERENCE TO RELATED APPLICATIONS

This is a continuation application of International Application No. PCT/JP2011/006323, with an international filing date of Nov. 11, 2011, which claims priority of Japanese Patent Application No.: 2011-162729 filed on Jul. 26, 2011, the content of which is incorporated herein by reference.

BACKGROUND

1. Technical Field

The technical field relates to an imaging apparatus capable of photographing with a plurality of imaging units from a plurality of viewpoints.

2. Related Art

In a digital camera of recent years, power consumption of image sensor and camera controller increases because of compatibility with high quality and video shooting, and thus heat value in the image sensor and the camera controller is large.

Further, as imaging apparatus capable of photographing with a plurality of imaging units at a plurality of viewpoints, a digital camera mounted with two optical systems and two imaging devices is known (for example, JP-A-2008-167066).

The digital camera described in JP-A-2008-167066 has an imaging device such as an image sensor including the two optical systems and two CCD devices in order to photograph stereoscopic images (3D images) that are stereoscopically viewable, and thus can photograph one subject from two right and left view points.

Since such a digital camera has two imaging units including an optical system and an imaging device, the heat value in the imaging unit become twice as large as that in a conventional technique and the heat value in the camera controller that processes photographed images becomes larger than the conventional technique.

Such an increase in the heat value causes a problem such that a digital camera has high temperature and thus does not operate properly, and a problem such that a user holds with difficulty the camera and thus operability of the digital camera is deteriorated. This problem will be described below.

SUMMARY

The increase in a heat value of a digital camera raises temperature of a metal member exposed to an outside of an exterior case. For example, the temperature of a brace mounting section made of metal used when a digital camera is mounted to a tripod or a monopod becomes high. The rise of the brace mounting section makes a user difficult to hold the digital camera, and thus the operability of the digital camera is deteriorated.

One non-limiting and exemplary embodiment provides an imaging apparatus having a plurality of imaging units, which can suppress deterioration in operability of the imaging apparatus caused by a rise in temperature near the brace mounting section.

Means for Solving the Problem

In one general aspect, an imaging apparatus of the present disclosure includes a first imaging unit, a second imaging unit whose use frequency is lower than that of the first imaging unit, an exterior case for housing the first imaging unit and the second imaging unit, and a brace mounting section mounted to the exterior case so as to be partially exposed to an outside. The first imaging unit, the second imaging unit and the brace mounting section are arranged so that a distance from the first imaging unit to the brace mounting section is longer than a distance from the second imaging unit to the brace mounting section.

According to the present disclosure, the imaging unit whose use frequency is higher is arranged to be farther from the brace mounting section than the imaging unit whose use frequency is lower. As a result, the temperature rise in the brace mounting section can be reduced, and the user easily holds the imaging apparatus, and thus deterioration in operability of the imaging apparatus can be suppressed.

DETAILED DESCRIPTION

1. Constitution of Entire Imaging Apparatus

An imaging apparatus according to one embodiment of the present disclosure will be described below by exemplifying a digital camera with reference to the drawings.

Figure 1:
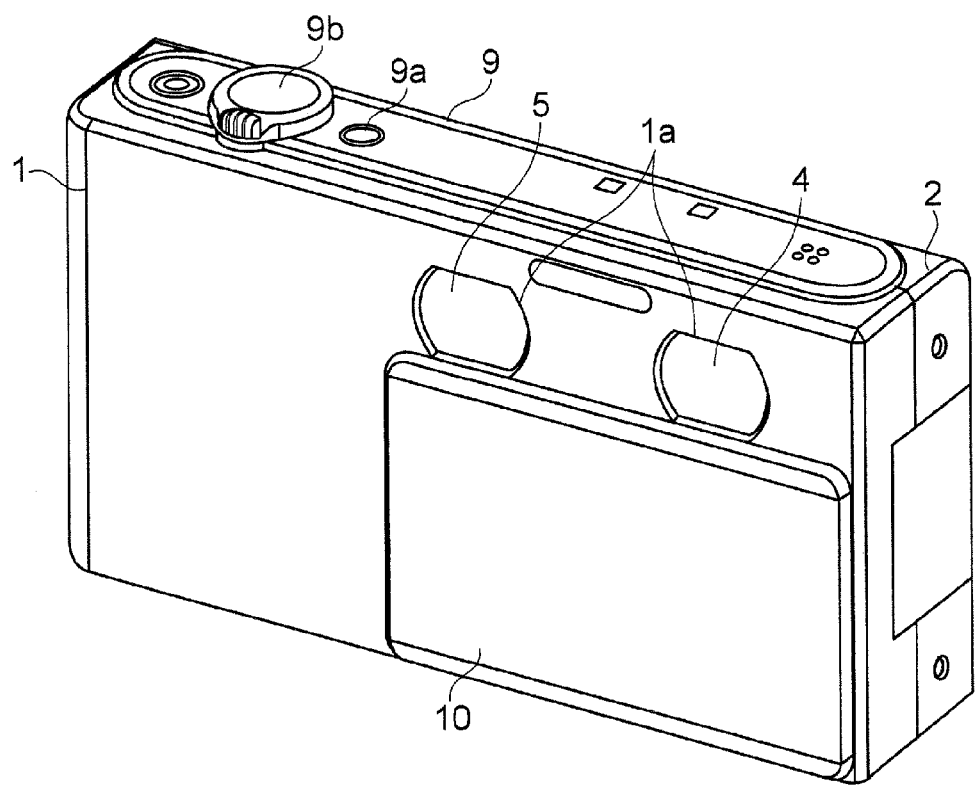
FIG. 1 is a perspective view illustrating appearance of a digital camera according to one embodiment of the present disclosure.
Figure 2:
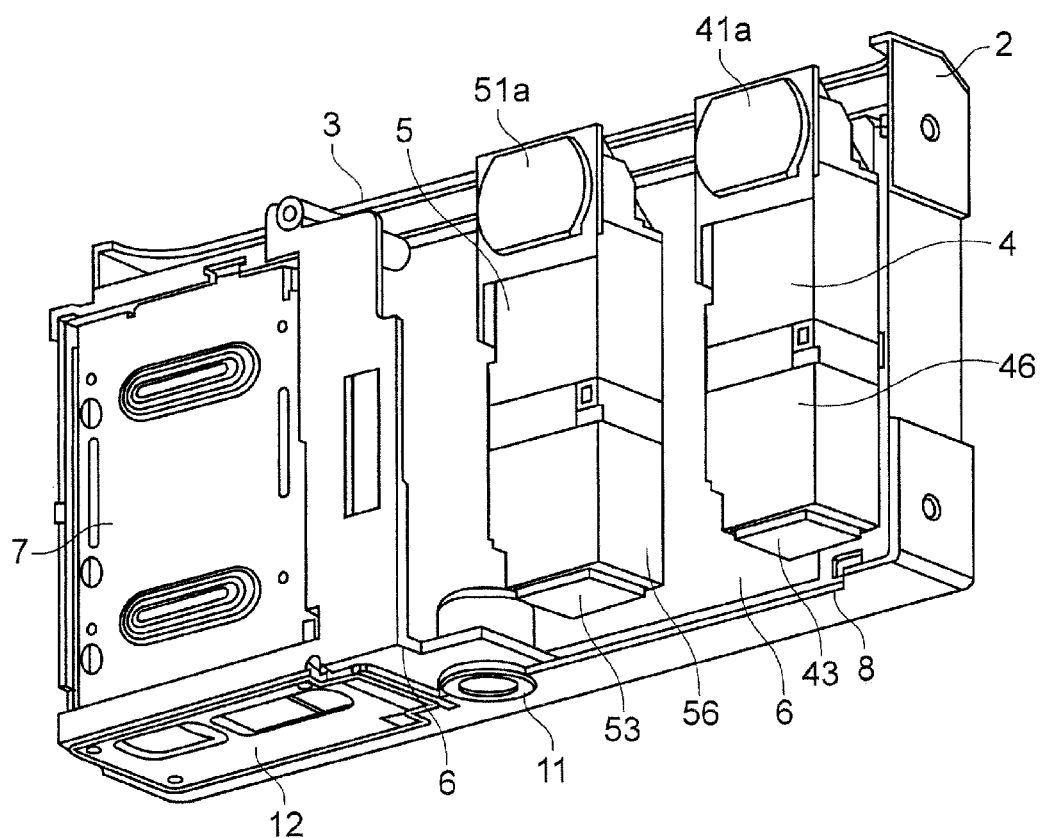
FIG. 2 is a perspective view illustrating an internal constitution from which a front case is removed in FIG. 1.

FIG. 1 is a perspective view illustrating appearance of the digital camera according to one embodiment of the present disclosure. FIG. 2 is a perspective view illustrating an internal constitution from which a front case in FIG. 1 is removed.

As shown in FIGS. 1 and 2, the digital camera is constituted so that a camera body 3 is housed in an exterior case having a front case 1 and a rear case 2. The digital camera according to the embodiment can capture a stereoscopic image that can be stereoscopically viewed. The camera body 3 has a first imaging unit 4 and a second imaging unit 5. The first imaging unit 4 and the second imaging unit 5 are mounted to a metal frame 6 inside the exterior case at an interval. Further, the camera body 3 has a power-supply block 7 that houses a battery (not shown) to be a power supply of the digital camera, and a circuit block 8 for controlling an operation of the camera body 3. The power-supply block 7 and the circuit block 8 are arranged in a space in the exterior case. The power-supply block 7 supplies a power which is to be used in the camera body 3, to respective units of the digital camera. The power-supply block 7 houses a battery inside, and includes a power-supply terminal to which a power-supply adaptor for converting an AC power to a DC power is connected.

Further, in the camera body 3, the first imaging unit 4 is arranged at an end portion of the exterior case (in FIG. 1, a right end), and the second imaging unit 5 is arranged at an approximately center portion of the exterior case. The first imaging unit 4 is an imaging unit that is always driven at a time of capturing an image in the digital camera. The second imaging unit 5 is an imaging unit that is driven only when a stereoscopic image is captured.

Further, an operating unit 9 including a main power switch 9a and a release button 9b is provided on an upper-surface portion of the exterior case. A slide cover 10 which is slidable up and down for opening and closing photographing windows 1a of the first imaging unit 4 and the second imaging unit 5 is arranged in the front case 1. A supporter receptacle 11 is arranged on a bottom portion of the exterior case so as to be exposed to the outside. The supporter receptacle 11 is made of metal such as stainless alloy, and is used for installing the digital camera to a supporter such as a tripod or a monopod. The supporter receptacle 11 is fixed to the frame 6. Only a portion which is to be fixed to the supporter such as the tripod or the monopod is exposed from the bottom portion of the exterior case.

Further, a cover 12 for opening and closing an opening through which the battery is housed in the internal space of the power-supply block 7 is provided on a bottom portion of the rear case 2 configuring the exterior case. A user of the digital camera can open and close the cover 12, to attach and detach the battery to and from the power-supply block 7.

2. Configuration of Imaging Unit

Figure 3:
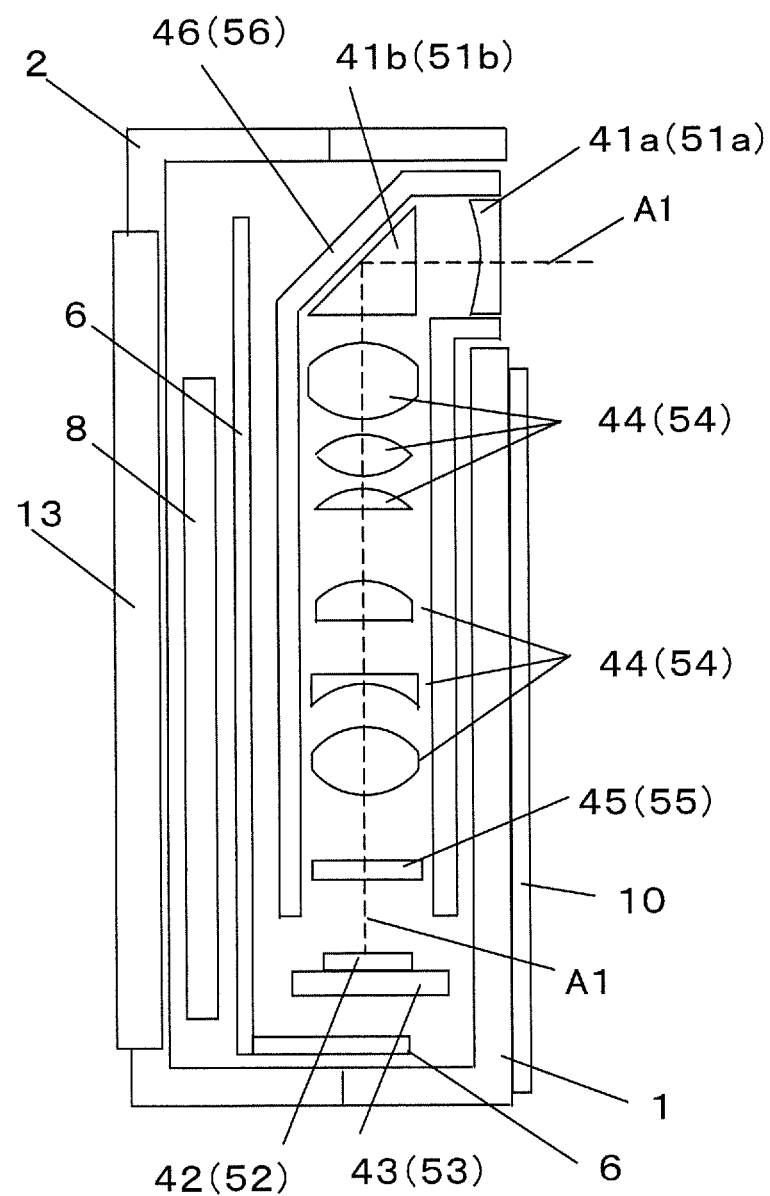
FIG. 3 is a schematic diagram describing a detailed constitution of an imaging unit.

FIG. 3 is a schematic constitutional diagram of the digital camera describing a constitution of the first imaging unit 4 or the second imaging unit 5 in detail. The first imaging unit 4 and the second imaging unit 5 have the same constitution.

As shown in FIGS. 1 and 2, the first imaging unit 4 and the second imaging unit 5 are arranged on an upper portion of the front case 1 opposed to the photographing windows 1a.

As shown in FIG. 3, each of the first imaging unit 4 and the second imaging unit 5 includes a lens unit, an image sensor 42(52), a circuit board 43(53), a lens group 44(54), a diaphragm unit 45(55), and a unit housing 46(56).

The lens unit includes a lens 41a(51a) for receiving an optical image A1 of a subject through the photographing windows 1a, and a flectional optical system 41b(51b) for leading an incident optical image A1 to the image sensor 42(52).

The image sensor 42(52) is arranged on a lower portion of the imaging unit, and converts the optical image A1 received by the lens unit into image data. The image sensor 42(52) is mounted on the circuit board 43(53), and includes, for example, CMOS.

A circuit for controlling the image sensor 42(52) and processing the image data obtained from the image sensor 42(52) is mounted on the circuit board 43(53).

The lens group 44 (54) and the diaphragm unit 45(55) are arranged between the lens unit and the image sensor 42(52).

The unit housing 46(56) houses parts which configure the first imaging unit 4 (the second imaging unit 5).

A camera monitor 13 including a liquid crystal display is arranged on a rear surface of the rear case 2.

3. Circuit Block

Figure 4:
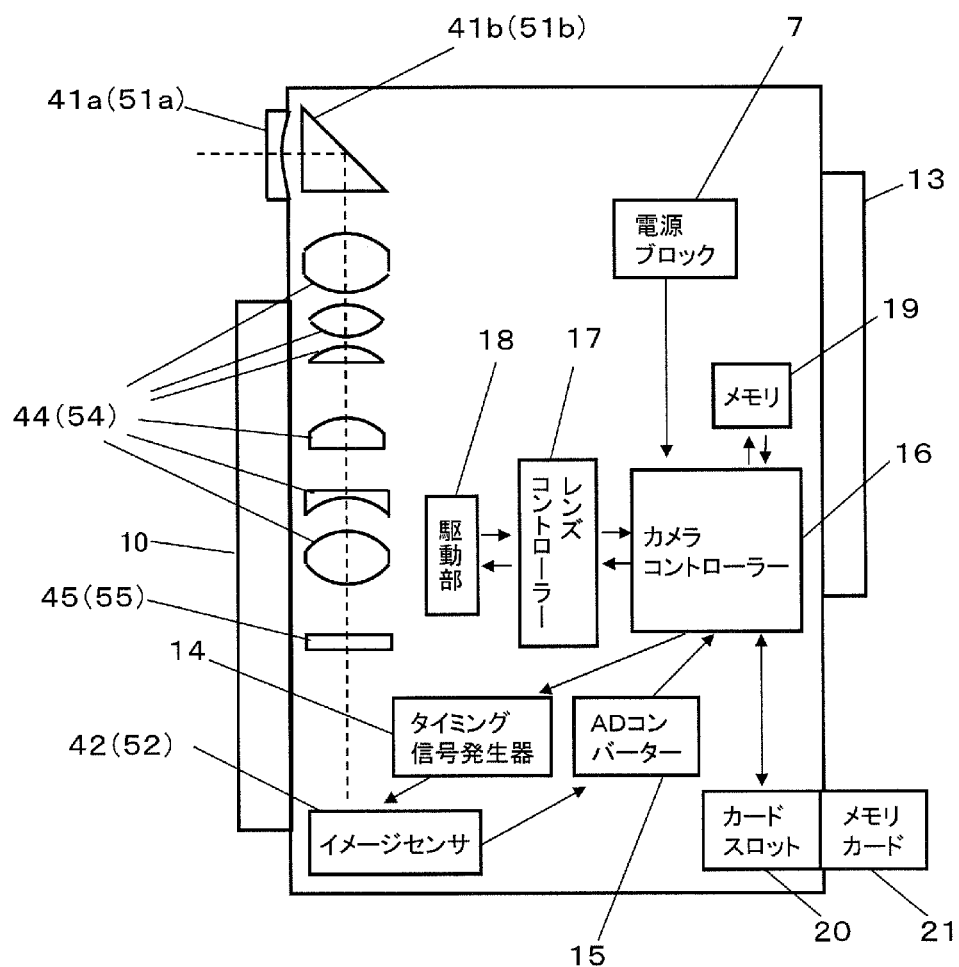
FIG. 4 is a schematic constitutional diagram illustrating a circuit block for controlling an operation of a camera body.

A constitution and an operation of the circuit block 8 of the camera body 3 are described. FIG. 4 is a schematic constitutional diagram mainly illustrating the constitution of the circuit block for controlling the operation of the camera body 3.

The circuit block 8 includes a camera controller 16, a lens controller 17, a driving section, and a memory 19. The circuit board 43(53) has a timing signal generator 14 and an AD converter 15.

The image sensor 42(52) converts an optical image of a subject which is incident via the lens unit, into image data such as still image data and moving image data. The image sensor 42(52) operates based on a timing signal from the timing signal generator 14 mounted on the circuit board 43(53) to convert the optical image into image data.

The image data converted by the image sensor 42(52) is converted into a digital signal by the AD converter 15 mounted on the circuit board 43(53), and is sent to the camera controller 16, then is subject to image processes. Examples of the image processes are a gamma correcting process, a white balance correcting process, a scratch correcting process, a YC converting process, an electronic zoom process, and a JPEG compressing process.

The camera controller 16 accepts an instruction from the operating unit 9 to control the respective units of the camera body 3. Concretely, the camera controller 16 transmits signals for controlling the first imaging unit 4 and the second imaging unit 5 to the lens controller 17, and receives various signals from the lens controller 17. The driving unit 18 drives the respective lens groups (a zoom lens group, an OIS lens group, and a focus lens group) of the optical systems in the first imaging unit 4 and the second imaging unit 5, and controls the diaphragm units 45(55) based on the control signal of the lens controller 17. The diaphragm unit 45(55) is a light amount adjusting member for adjusting an amount of light transmitting thorough the optical system.

When the camera controller 16 controls a driving of the respective lens groups and the diaphragm units 45(55) of the first imaging unit 4 and the second imaging unit 5, the memory 19 is used when the camera controller 16 temporarily saves data, and saves programs and parameters for controlling the camera controller 16.

A memory card 21 is detachably attached into a card slot 20. The card slot 20 controls the memory card 21 based on a control signal transmitted from the camera controller 16, and writes and reads still image data and moving image data obtained from the image sensor 42(52). Further, the card slot 20 is provided in a space where the power-supply block 7 is arranged, in the exterior case.

When the cover 12 for attaching and detaching a battery is open, the memory card 21 can be attached into and detached from the card slot 20.

The moving image data generated by the image sensor 42(52) is used also for displaying a through image. The through image is a moving image that is not recorded as moving image data in the memory card 21. The through image is subject to the image process in the camera controller 16, and is displayed on the camera monitor 13 so that a user determines a composition of a moving image or a still image.

4. Arrangement of Two Imaging Units

The digital camera according to this embodiment has two imaging units, namely, the first imaging unit 4 and the second imaging unit 5. The digital camera can photograph a non-stereoscopic image (2D image) using the first imaging unit 4 and can photograph a stereoscopic image (3D image) using two imaging units, namely, the first imaging unit 4 and the second imaging unit 5 simultaneously.

The inventors of the present disclosure considered and experimented a constitution that reduces a temperature rise of the brace mounting section 11 caused by heat generation in the digital camera having the two imaging units described in "SUMMARY". In this experiment, there is assumed the digital camera that can photograph a non-stereoscopic image obtained by the first imaging unit 4 and can photograph a stereoscopic image using the two imaging units, namely, the first imaging unit 4 and the second imaging unit 5. In a case of such a digital camera, the first imaging unit 4 is driven at a time of photographing both a stereoscopic images and a non-stereoscopic image, but the second imaging unit 5 is driven only at a time of photographing a stereoscopic image. For this reason, it was found that the temperature near the second imaging unit 5 does not rise in comparison with the temperature near the first imaging unit 4 that is always driven.

From this fact, the inventors figured out that when a position of the brace mounting section 11 is arranged so that a distance from the brace mounting section 11 to the first imaging unit 4 is longer than a distance form the brace mounting section 11 to the second imaging unit 5, the temperature rise in the brace mounting section 11 can be suppressed. This will be described in detail below.

Figure 5:
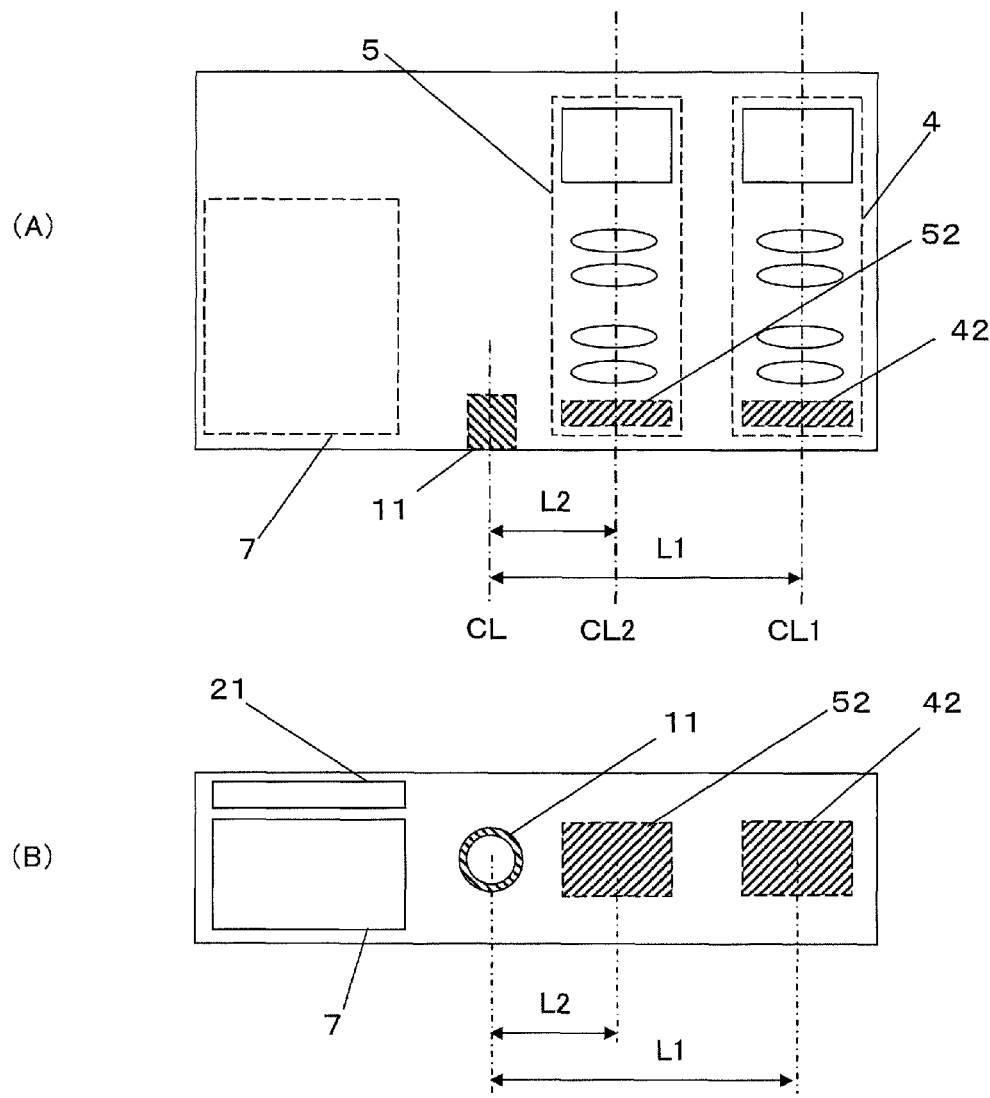
FIG. 5 is a schematic diagram illustrating one example of an arrangement between a first imaging unit and a brace mounting section and between a second imaging unit and the brace mounting section in the digital camera.

FIG. 5 is a schematic diagram describing an arrangement state between the first imaging unit 4 and the brace mounting section 11 and between the second imaging unit 5 and the brace mounting section 11 in the digital camera according to this embodiment. FIG. 5(A) is the diagram viewed from a front, and FIG. 5B is the diagram viewed from a bottom.

As shown in FIG. 5, in this embodiment, a gap between the first imaging unit 4 and the brace mounting section 11 is determined as L1, and a gap between the second imaging unit 5 and the brace mounting section 11 is determined as L2. At this time, the brace mounting section 11 is arranged on the bottom surface of the exterior case so that L1>L2.

The positions of the first imaging unit 4 and the second imaging unit 5 are based on centers CL1 and CL2 of optical axes in the image sensors 42 and 52, and the position of the brace mounting section 11 is based on a center CL.

As shown in FIG. 5, in the exterior case, the brace mounting section 11 is arranged between the power-supply block 7 and the second imaging unit 5. Further, the memory card 21 is arranged in an internal space of the exterior case where the power-supply block 7 is arranged. Such an arrangement provides an advantage that creates a better weight balance.

5. Conclusion of the Embodiment

In this embodiment, the first imaging unit 4, the second imaging unit 5 and the brace mounting section 11 are arranged so that the gap L1 between the first imaging unit 4 and the brace mounting section 11 becomes longer than the gap L2 between the second imaging unit 5 and the brace mounting section 11. As a result, since a heat generated in the first imaging unit 4 that is always driven is unlikely to transfer to the brace mounting section 11, the temperature rise in the brace mounting section 11 can be suppressed. As a result, overheat of the brace mounting section 11 can be prevented, the user easily holds the digital camera, and the reduction in operability of the digital camera can be suppressed.

6. Another Embodiment

The above embodiment used the CMOS as the image sensor, but the present disclosure is not limited to this, and thus another image sensor such as CCD may be used.

Further, in the above embodiment, the photographing of stereoscopic images and photographing of non-stereoscopic images are compartmentalized, but the present disclosure is not limited to this. A mode using only one imaging unit may be suitably separated from a mode using both the two imaging units according to an operating system of the digital camera. For example, as the photographing mode for non-stereoscopic images, the mode using only the first imaging unit 4 and the mode using both the first imaging unit 4 and the second imaging unit 5 may be provided.

Further, in the above embodiment, the first imaging unit 4 is always driven, and the second imaging unit 5 is driven only at the time of photographing a stereoscopic imaging, but the present disclosure is not limited to this. The imaging unit whose temperature is higher than the other one may be separated from the brace mounting section 11 according to an operating system of the digital camera.

In the above embodiment, the brace mounting section 11 is arranged between the power-supply block 7 and the second imaging unit 5, but the present disclosure is not limited to this.

Figure 6:
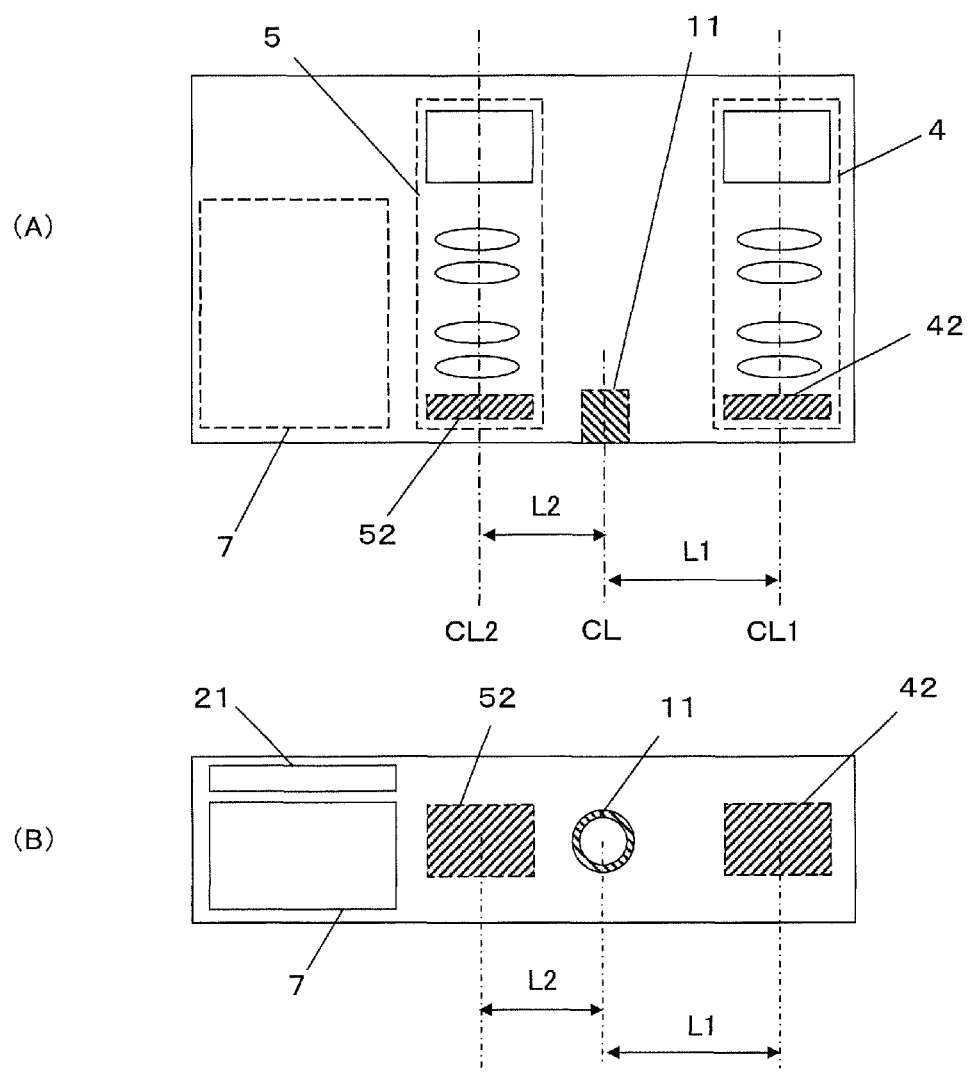
FIG. 6 is a schematic diagram illustrating another example of the arrangement between the first imaging unit and the brace mounting section and between the second imaging unit and the brace mounting section in the digital camera.
Figure 7:
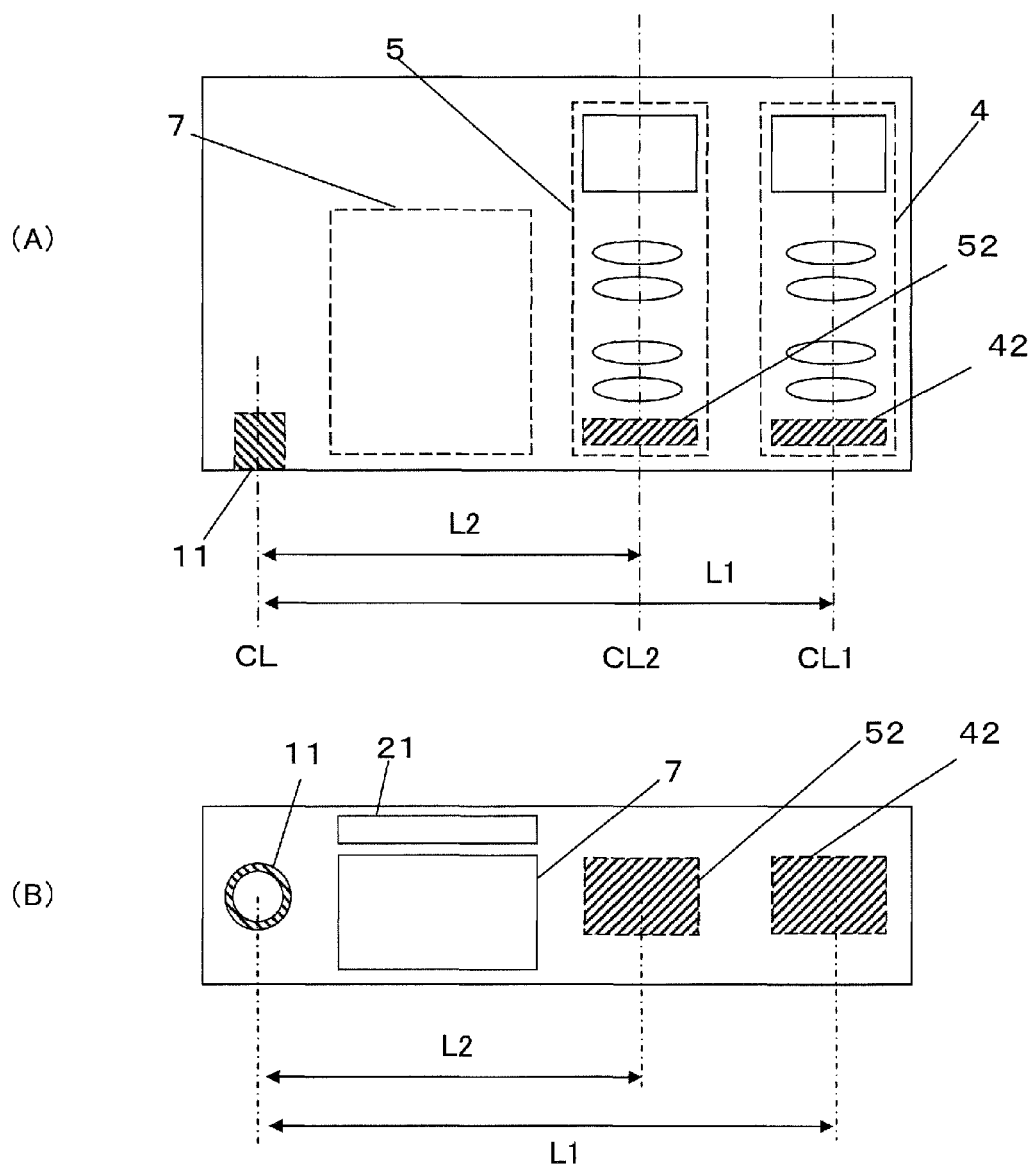
FIG. 7 is a schematic diagram illustrating still another example of the arrangement between the first imaging unit and the brace mounting section and between the second imaging unit and the brace mounting section in the digital camera.

FIGS. 6, and 7 are diagrams illustrating another arrangement states between the first imaging unit 4 and the brace mounting section 11 and between the second imaging unit 5 and the brace mounting section 11. The constitution is similar to that shown in FIG. 5 except for the position of the brace mounting section 11.

In an example shown in FIG. 6, the brace mounting section 11 is arranged between the first imaging unit 4 and the second imaging unit 5. In an example shown in FIG. 7, the power-supply block 7 is arranged between the brace mounting section 11 and the second imaging unit 5. Such an arrangement can produce the similar effect to that in the above embodiment.

Further, in the above embodiment, the arrangement among the brace mounting section and the two imaging units is determined so that the temperature rise in the brace mounting section is reduced, but the present disclosure is not limited to this. An arrangement between parts touched by a part of a user's body of the other parts arranged to be exposed from the exterior case and the two imaging units may be determined according to the inventive concept.

Industrial Applicability

The present disclosure is useful for improving the operability of the imaging apparatus capable of photographing stereoscopic images.

The invention claimed is:

1. An imaging apparatus, comprising:
a first imaging unit;
a second imaging unit whose use frequency is lower than that of the first imaging unit;
an exterior case for housing the first imaging unit and the second imaging unit; and
a brace mounting section mounted to the exterior case so as to be partially exposed to an outside;
wherein the first imaging unit, the second imaging unit and the brace mounting section are arranged so that a distance from the first imaging unit to the brace mounting section is longer than a distance from the second imaging unit to the brace mounting section.

2. The imaging apparatus according to claim 1, wherein the first imaging unit and the second imaging unit are used at a time of photographing a stereoscopic image, and only the first imaging unit is used at a time of photographing a non-stereoscopic image.

3. The imaging apparatus according to claim 1, wherein a mode using only the first imaging unit and a mode using the first imaging unit and the second imaging unit are provided as a non-stereoscopic image photographing mode.

4. The imaging apparatus according to claim 1, further comprising:
a power-supply block housed in the exterior case,
wherein the brace mounting section is arranged between the power-supply block and the second imaging unit.

5. The imaging apparatus according to claim 1, wherein the brace mounting section is arranged between the first imaging unit and the second imaging unit.

6. The imaging apparatus according to claim 1, further comprising:
a power-supply block housed in the exterior case,
wherein the power-supply block is arranged between the brace mounting section and the second imaging unit.

7. The imaging apparatus according to claim 1,
wherein the first imaging unit includes a first image sensor,
wherein the second imaging unit includes a second image sensor,
wherein the brace mounting section is mounted to a side of the exterior case, and
wherein the first image sensor and the second image sensor are arranged near the side of the exterior case to which the brace mounting section is mounted.

* * * * *